(12) United States Patent
Akiyama (10) Patent No.: US 11,353,784 B2
(45) Date of Patent: Jun. 7, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/025,027

(22) Filed: Sep. 18, 2020

(65) Prior Publication Data

US 2021/0088887 A1 Mar. 25, 2021

(30) Foreign Application Priority Data

Sep. 20, 2019 (JP) .............................. JP2019-171301

(51) Int. Cl.
| | |
|---|---|
| *G03B 21/20* | (2006.01) |
| *G02B 5/02* | (2006.01) |
| *G02B 27/28* | (2006.01) |
| *H04N 9/31* | (2006.01) |

(52) U.S. Cl.
CPC ......... *G03B 21/204* (2013.01); *G02B 5/0205* (2013.01); *G02B 27/283* (2013.01); *G03B 21/2013* (2013.01); *G03B 21/2073* (2013.01); *H04N 9/3161* (2013.01); *H04N 9/3164* (2013.01)

(58) Field of Classification Search
CPC .............. G03B 21/204; G03B 21/2013; G03B 21/2073; H04N 9/3161; H04N 9/3164
USPC .......................................................... 353/20
See application file for complete search history.

(56) References Cited

U.S. PATENT DOCUMENTS

| | | | | |
|---|---|---|---|---|
| 8,562,141 B2* | 10/2013 | Ogino | ................... | G03B 21/208 |
| | | | | 353/38 |
| 10,921,700 B2* | 2/2021 | Park | ....................... | H04N 9/315 |
| 2015/0167932 A1 | 6/2015 | Yamada et al. | | |
| 2015/0301438 A1* | 10/2015 | Akiyama | ........... | G03B 21/2033 |
| | | | | 353/20 |
| 2016/0011497 A1* | 1/2016 | Akiyama | ............. | G03B 21/204 |
| | | | | 353/31 |
| 2018/0017856 A1 | 1/2018 | Tanaka et al. | | |
| 2018/0031959 A1 | 2/2018 | Yasumatsu et al. | | |
| 2018/0252992 A1 | 9/2018 | Akiyama | | |

FOREIGN PATENT DOCUMENTS

| | | |
|---|---|---|
| JP | 2015-049441 A | 3/2015 |
| JP | 2015-203857 A | 11/2015 |
| JP | 2016-142983 A | 8/2016 |
| JP | 2016-170422 A | 9/2016 |

(Continued)

*Primary Examiner* — Jerry L Brooks
(74) *Attorney, Agent, or Firm* — Dority & Manning, P.A.

(57) ABSTRACT

A light source device according to the present disclosure includes a plurality of light emitting elements, a diffusion element which light beams including a plurality of beams emitted from the plurality of light emitting elements enter, and which diffuses the light beams, and an optical element configured to divide the light beams emitted from the plurality of light emitting elements into plurality of partial light beams, wherein the diffusion element has a plurality of diffusion areas disposed so as to correspond to the plurality of partial light beams obtained by the optical element dividing the light beams emitted from the plurality of light emitting elements.

14 Claims, 6 Drawing Sheets

(56) References Cited

FOREIGN PATENT DOCUMENTS

| | | |
|---|---|---|
| JP | 2017-062294 A | 3/2017 |
| JP | 2018-013764 A | 1/2018 |
| JP | 2018-017816 A | 2/2018 |

\* cited by examiner

LIGHT SOURCE DEVICE AND PROJECTOR

The present application is based on, and claims priority from JP Application Serial Number 2019-171301, filed Sep. 20, 2019, the disclosure of which is hereby incorporated by reference herein in its entirety.

BACKGROUND

1. Technical Field

The present disclosure relates to a light source device and a projector.

2. Related Art

As a light source device used in a projector, there is proposed a light source device which is provided with a light emitting element such as a semiconductor laser, and uses fluorescence emitted from a phosphor when irradiating the phosphor with excitation light emitted from the light emitting element.

In JP-A-2017-62294 (Document 1), there is disclosed a light source device provided with a first light split element for splitting the light emitted from a first light emitting section into a first pencil of light and a second pencil of light, a second light split element for splitting the light emitted from a second light emitting section into a third pencil of light and a fourth pencil of light, a phosphor layer which the first pencil of light and the third pencil of light enter, and a rotary diffuser plate which the second pencil of light and the fourth pencil of light enter. In the rotary diffuser plate described above, a first diffused light emitting section which the second pencil of light enters and a second diffused light emitting section which the fourth pencil of light enters are disposed at respective positions different in distance from the rotational axis from each other.

In JP-A-2015-49441 (Document 2), there is disclosed an illumination device provided with a light source device, a phosphor layer of a reflective type for emitting fluorescence due to light from the light source device, a polarization split element for reflecting a part of the light from the light source device, transmitting the rest, and at the same time, transmitting the fluorescence, and a diffusely reflecting element for diffusely reflecting the light transmitted through the polarization split element. The diffusely reflecting element described above is formed of a diffusion element not provided with a motor for driving a diffuser plate, namely a so-called stationary diffusion element.

In the rotary diffuser plate described in Document 1, there is a problem that accessory components such as a driving motor, a power supply, and a control circuit become necessary besides the diffuser plate, and thus, the cost and the size of the light source device increase. This problem can be solved by using the stationary diffusion element described in Document 2. However, as the light source device increases in luminance, the density of the light with which the diffusion element is irradiated locally increases, and thus, the load on the diffusion element increases. As a result, there is a possibility that the reliability of the diffusion element degrades, and in some cases, the diffusion element is damaged.

SUMMARY

A light source device according to an aspect of the present disclosure includes a plurality of light emitting elements, a diffusion element which light beams including a plurality of beams emitted from the plurality of light emitting elements enter, and which diffuses the light beams, and an optical element configured to divide the light beams emitted from the plurality of light emitting elements into a plurality of partial light beams, wherein the diffusion element has a plurality of diffusion areas disposed so as to correspond to the plurality of partial light beams obtained by the optical element dividing the light beams emitted from the plurality of light emitting elements.

In the light source device according to the aspect of the present disclosure, a number of the diffusion areas may be no larger than a number of the light emitting elements.

In the light source device according to the aspect of the present disclosure, the optical element may include a plurality of first lenses disposed so as to correspond to the plurality of diffusion areas.

In the light source device according to the aspect of the present disclosure, outer circumferences having an effective diameter of the first lenses may be partially contiguous with each other.

In the light source device according to the aspect of the present disclosure, the optical element may be formed of a lens array having the plurality of first lenses integrated with each other.

The light source device according to the aspect of the present disclosure may further include a second lens configured to collimate the beams emitted from the plurality of light emitting elements, wherein the effective diameter of the first lens may be no smaller than an effective diameter of the second lens.

The light source device according to the aspect of the present disclosure may further include a polarization split element disposed between the plurality of light emitting elements and the optical element, wherein the polarization split element may split the light beams emitted from the plurality of light emitting elements into a first polarization component and a second polarization component different from the first polarization component.

The light source device according to the aspect of the present disclosure may further include a wavelength conversion element configured to perform wavelength conversion of the beams emitted from the plurality of light emitting elements, wherein the first polarization component may enter the diffusion element, and the second polarization component may enter the wavelength conversion element.

A projector according to another aspect of the present disclosure includes the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

Hereinafter, an embodiment of the present disclosure will be described using FIG. 1 through FIG. 5.

It should be noted that in each of the drawings described below, the constituents are shown with the scale ratios of respective sizes set differently between the constituents in some cases is order to facilitate the visualization of each of the constituents.

Figure 1:
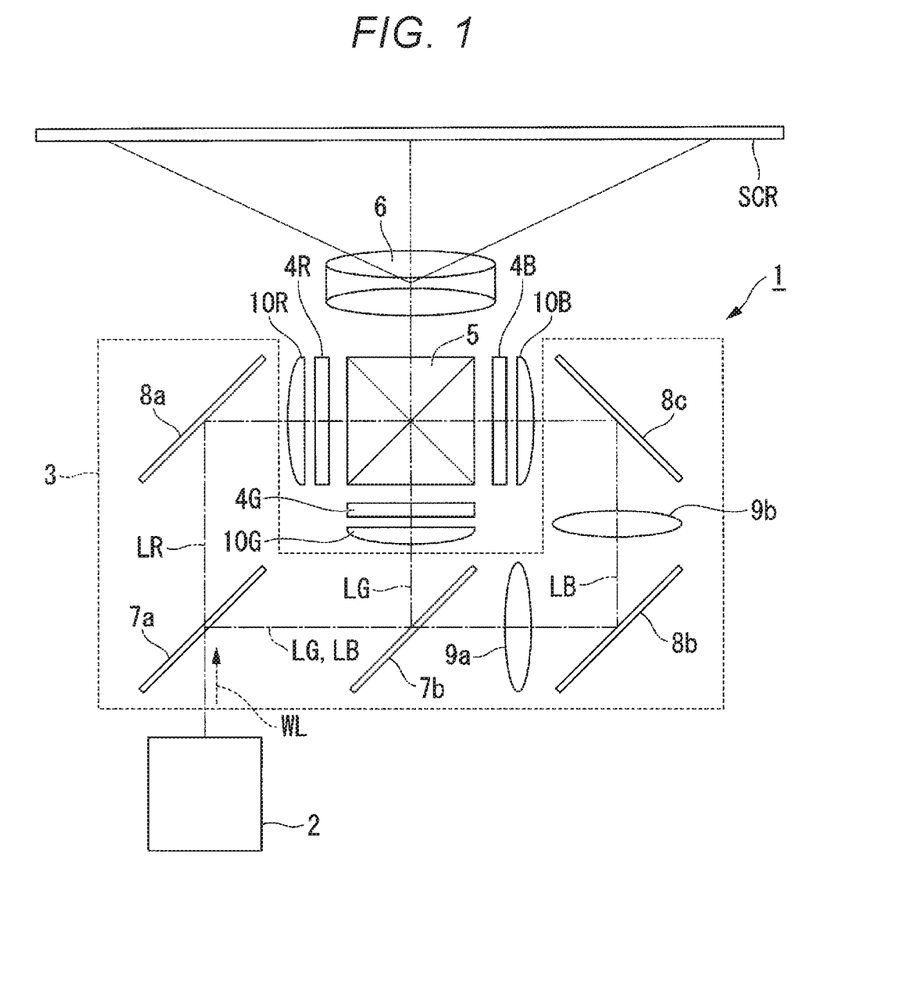
FIG. 1 is a schematic configuration diagram of a projector according to a first embodiment of the present disclosure.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with a light source device 2, a color separation optical system 3, a light modulation device 4R, a light modulation device 4G, a light modulation device 4B, a combining optical system 5, and a projection optical device 6.

The light source device 2 according to the present embodiment emits illumination light WI toward the color separation optical system 3. In the present embodiment, the illumination light WL is white light. The detailed explanation of the light source device 2 will be described later.

The color separation optical system 3 separates the illumination light WL from the light source device 2 into red light LR in a wavelength band of, for example, 600 nm through 700 nm, green light LG in a wavelength band of, for example, 500 nm through 600 nm, and blue light LB in a wavelength band of, for example, 440 nm through 470 nm.

The color separation optical system 3 is provided with a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source device 2 into the red light LR, and light including the green light LG and the blue light LB. The first dichroic mirror 7a transmits the red light LR thus separated, and at the same time reflects the light including the green light LG and the blue light LB. Incidentally, the second dichroic mirror 7b reflects the green light LG and at the same time transmits the blue light LB to thereby separate the light including the green light LG and the blue light LB into the green light LG and the blue light LB.

The first total reflection mirror 8a is disposed in the light path of the red light LR, and the red light LR which has been transmitted through the first dichroic mirror 7a is reflected by the first total reflection mirror 8a toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the tight path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

In each of the light modulation device 4R, the light modulation device 4G, and the light modulation device 4B, there is provided a transmissive liquid crystal panel. Further, on the incidence side and the exit side of each of the liquid crystal panels, there are respectively disposed polarization plates (not shown). Hereinafter, the light modulation device 4R, the light modulation device 4G, and the light modulation device 4B are simply referred to as the light modulation devices 4R, 4G, and 4B.

On the incidence side of the light modulation devices 4R, 4G, and 4B, there are respectively disposed a field lens 10R, a field lens 10G, and a field lens 10B. The field lens 10R, the field lens 10G, and the field lens 10B respectively collimate the red light LR, the green light LG, and the blue light LB entering the respective light modulation devices 4R, 4G, and 4B.

The image light from each of the light modulation devices 4R, 4G, and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical device 6. The color combining optical system 5 is formed of a cross dichroic prism.

The projection optical device 6 is constituted by a plurality of projection lenses. The projection optical device 6 projects the image light having been combined by the combining optical system 5 toward the screen SCR in an enlarged manner. Thus, the color image enlarged is displayed on the screen SCR.

Light Source Device

The light source device 2 will hereinafter be described.

Figure 2:
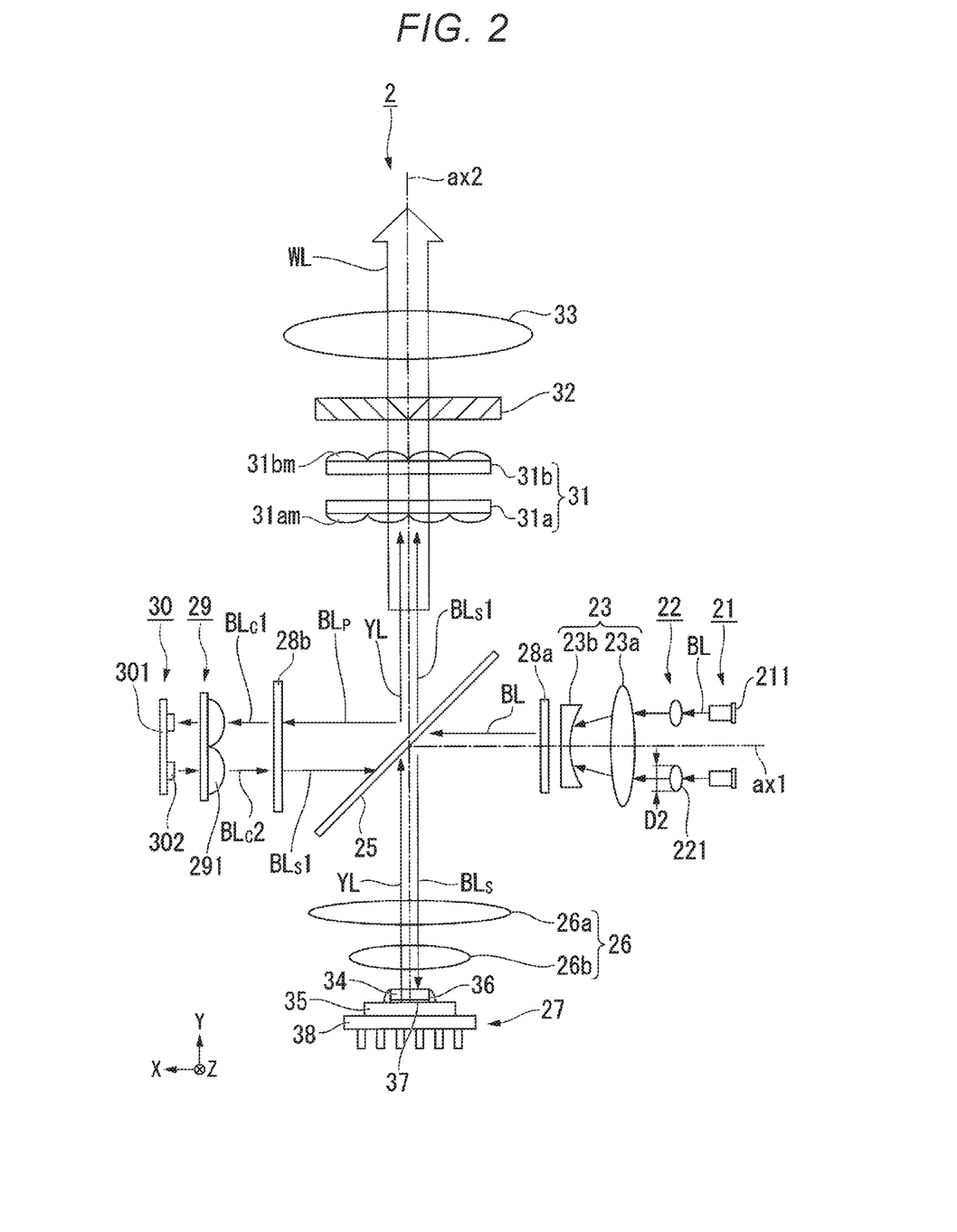
FIG. 2 is a schematic configuration diagram of an illumination device according to the first embodiment.
Figure 3:
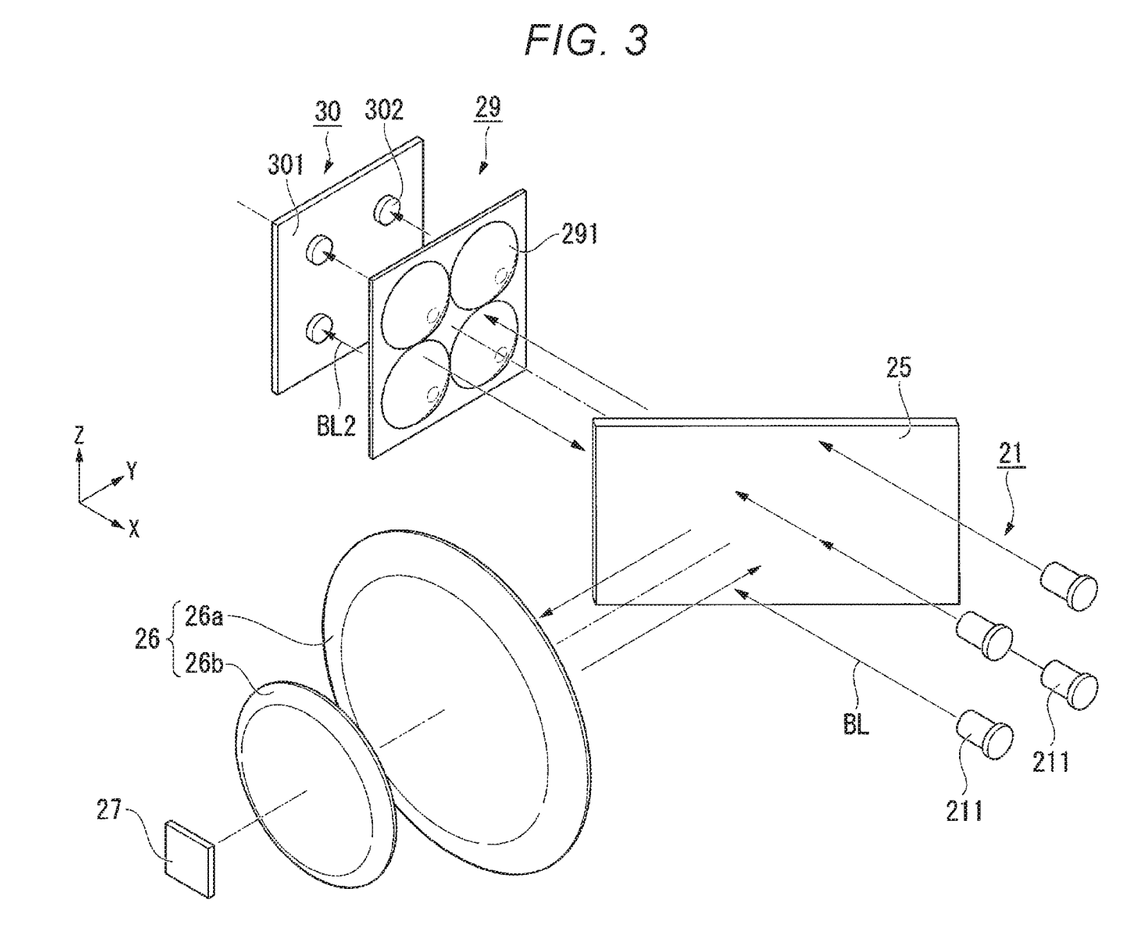
FIG. 3 is a perspective view of a principal part of a light source device.

FIG. 2 is a schematic configuration diagram of the light source device 2. FIG. 3 is a perspective view of a principal part of the light source device 2. In FIG. 3, illustrations of a collimator optical system 22, an afocal optical system 23, a first wave plate 28a, a second wave plate 28b, a lens integrator 31, a polarization conversion element 32, a superimposing lens 33, and so on are omitted.

As shown in FIG. 2, the light source device 2 is provided with a blue light source section 21 having a plurality of light emitting elements 211, the collimator optical system 22, the afocal optical system 23, the first wave plate 28a, a light splitting/combining element 25 (a polarization split element), a light collection optical system 26, a wavelength conversion element 27, the second wave plate 28b, a pickup lens array 29 (an optical element), diffusion element 30, the lens integrator 31, the polarization conversion element 32, and the superimposing lens 33.

The description will hereinafter be presented using an XYZ coordinate system defining a direction along a principal ray of light beams BL emitted from the blue light source section 21 as an X-axis direction, a direction along a principal ray of light WL emitted from the superimposing lens 33 as a Y-axis direction, and a direction perpendicular to the X-axis direction and the Y-axis direction as a Z-axis direction.

The blue light source section 21, the collimator optical system 22, the afocal optical system 23, the first wave plate 28a, the light splitting/combining element 25, the second wave plate 28b, the pickup lens array 29, and the diffusion element 30 are arranged in sequence on a light axis ax1. It should be noted that the light axis ax1 is a central axis of a light beam when assuming a bundle of the plurality of light beams BL emitted from the blue light source section 21 as the flux.

Meanwhile, the wavelength conversion element 27, the light collection optical system 26, the light splitting/combining element 25, the lens integrator 31, the polarization conversion element 32, and the superimposing lens 33 are arranged in sequence on an illumination light axis ax2. The illumination light axis ax2 is a central axis of the light WL emitted from the light source device 2. The light axis ax1 and the illumination light axis ax2 are located in the same plane, and are perpendicular to each other.

The blue light source section 21 has a plurality of light emitting elements 211. The light emitting elements 211 are each formed of a CAN package-type semiconductor laser element. As shown in FIG. 3, the plurality of light emitting elements 211 is arranged in a 2×2 array along the Y-axis direction and the Z-axis direction in a plane perpendicular to the light axis ax1. Specifically, the blue light source section 21 has the four light emitting elements 211. The light emitting elements 211 each emit the light beam BL consisting of a blue laser beam in a wavelength band of, for example, 440 nm through 470 nm.

As shown in FIG. 2, the light beams BL emitted from the blue light source section 21 enter the collimator optical system 22. The collimator optical system 22 converts the light beams BL emitted from the blue light source section 21 into parallel light beams. The collimator optical system 22 has a plurality of collimator lenses 221 (second lenses) arranged in a 2×2 array along the Y-axis direction and the Z-axis direction. The collimator lenses 221 are disposed so as to correspond respectively to the light emitting elements 211.

The light beams BL having passed through the collimator optical system 22 enter the afocal optical system 23. The afocal optical system 23 adjusts the beam diameters of the light beams BL having entered the afocal optical system 23. In the case of the present embodiment, the afocal optical system 23 reduces the beam diameters of the light beams BL having entered the afocal optical system 23 compared to the beam diameters of the light beams BL which have not entered the afocal optical system 23. The afocal optical system 23 is constituted by a convex lens 23a and a concave lens 23b.

The light beams BL having passed through the afocal optical system 23 enter the first wave plate 28a. The first wave plate 28a is formed of, for example, a ½ wave plate which is made rotatable. The light beams BL emitted from the light emitting elements 211 are each linearly polarized light having a specific polarization direction. By appropriately setting the rotational angle of the first wave plate 28a, it is possible to convert the light beams BL transmitted through the first wave plate 28a into light beams including an S-polarization component and a P-polarization component with respect to the light splitting/combining element 25 at a predetermined rate. Further, by rotating the first wave plate 28a, it is possible to change the ratio between the S-polarization component and the P-polarization component.

The light beams BL, which are generated by passing through the first wave plate 28a, and include the S-polarization component and the P-polarization component, enter the light splitting/combining element 25. The light splitting/combining element 25 is arranged so as to form an angle of 45° with respect to each of the light axis ax1 and the illumination light axis ax2. The light splitting/combining element 25 has a polarization split function of splitting each of the light beams BL into a light beam BLs as the S-polarization component with respect to the light splitting/combining element 25 and a light beam BLp as the P-polarization component. Further, the light splitting/combining element 25 has a color separation function of transmitting the fluorescence YL as yellow fluorescence different in wavelength band from the light beams BL as the blue light beams irrespective of the polarization state of the fluorescence YL. Thus, the light splitting/combining element 25 functions as a light combining unit for combining a light beam BLs1 as the S-polarization component of the light beams BL and the fluorescence YL with each other as described later.

Specifically, the light splitting/combining element 25 reflects the light beam BLs as the S-polarization component, and transmits the light beam BLp as the P-polarization component. Thus, the light beam BLp (a first polarization component) as the P-polarization component enters the diffusion element 30, and the light beam BLs (a second polarization component) as the S-polarization component enters the wavelength conversion element 27. Specifically, the light beam BLs as the S-polarization component reflected by the light splitting/combining element 25 enters the light collection optical system 26. The light collection optical system 26 converges the light beam BLs toward a phosphor layer 34.

In the present embodiment, the light collection optical system 26 is constituted by a first lens 26a and a second lens 26b. The light beam BLs having been emitted from the light collection optical system 26 enters the wavelength conversion element 27 in a converged state. The wavelength conversion element 27 has the phosphor layer 34, a substrate 35 for supporting the phosphor layer 34, and a fixation member 36 for fixing the phosphor layer 34 to the substrate 35.

In the present embodiment, the phosphor layer 34 is fixed to the substrate 35 with the fixation member 36 disposed between a side surface of the phosphor layer 34 and the substrate 35. The phosphor layer 34 has contact with the substrate 35 in a surface on an opposite side to the side which the light beams BLs enter.

The phosphor layer 34 includes a phosphor which absorbs the light beams BLs to thereby be excited. The phosphor layer 34 includes, for example, an yttrium aluminum garnet (YAG) phosphor. Taking YAG:Ce including cerium (Ce) as an activator agent for example, as the phosphor layer 34, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. The phosphor excited by the light beams BLs emits the fluorescence YL as the yellow fluorescence in the wavelength band of, for example, 500 through 700 nm.

On a surface of the phosphor layer 34 which is different from the surface which the light beams BLs enter, there is disposed a reflecting layer 37. The reflecting layer 37 reflects a component proceeding toward the substrate 35 out of the fluorescence YL generated by the phosphor layer 34. The reflecting layer 37 is formed of a material such as a metal film or a dielectric multilayer film.

On a surface of the substrate 35 which is different from the surface for supporting the phosphor layer 34, there is disposed a heatsink 38. In the wavelength conversion element 27, since the heat generated in the phosphor layer 34 can be released via the heatsink 38, it is possible to suppress the deterioration in the phosphor layer 34 due to the heat.

A part of the fluorescence YL generated by the phosphor layer 34 is reflected by the reflecting layer 37, and is then emitted outside the phosphor layer 34. Further, another part of the fluorescence YL generated by the phosphor layer 34 is emitted outside the phosphor layer 34 without the intervention of the reflecting layer 37. In such a manner as described above, the fluorescence YL is emitted from the phosphor layer 34.

The fluorescence YL emitted from the phosphor layer 34 is non-polarized light. The fluorescence YL passes through the light collection optical system 26, and then enters the light splitting/combining element 25. The fluorescence YL is transmitted through the light splitting/combining element 25, and then proceeds toward the lens integrator 31.

Meanwhile, the light beams BLp as the P-polarized light having been transmitted through the light splitting/combining element 25 enter the second wave plate 28b. The second wave plate 28b is formed of a ¼ wave plate disposed in the light path between the light splitting/combining element 25 and the diffusion element 30. The light beam BLp as the P-polarized light having been transmitted through the light splitting/combining element 25 is converted by the second wave plate 28b into, for example, blue light beam BLc1 as clockwise circularly polarized light, and then enters the pickup lens array 29.

Figure 4:
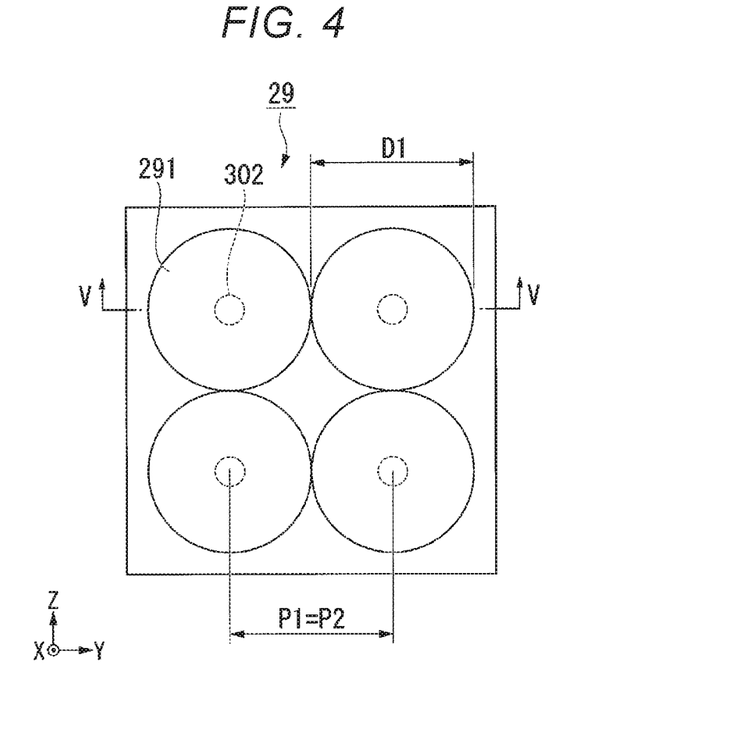
FIG. 4 is a front view of a pickup lens array and a diffusion element.
Figure 5:
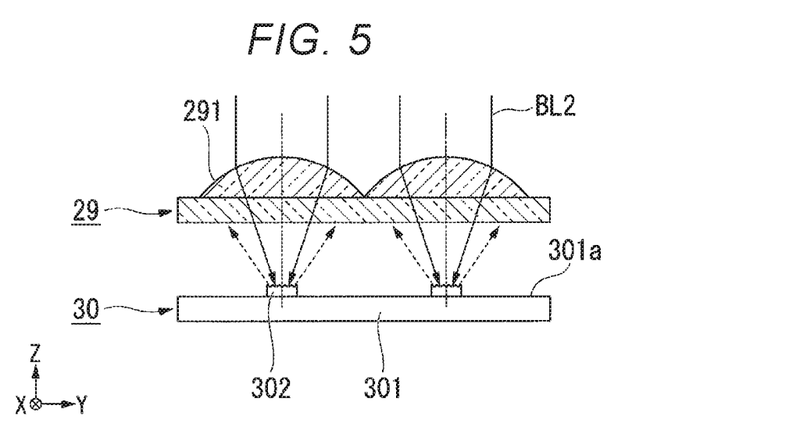
FIG. 5 is a cross-sectional view along the V-V line shown in FIG. 4.

FIG. 4 is a front view of the pickup lens array 29 and the diffusion element 30. FIG. 5 is a cross-sectional view along the V-V line shown in FIG. 4.

As shown in FIG. 3 and FIG. 4, the pickup lens array 29 has a plurality of pickup lenses 291 (first lenses) arranged in a 2×2 array along the Y-axis direction and the Z-axis direction. In other words, the pickup lens array 29 has the plurality of pickup lenses 291 disposed so as to correspond to diffusion areas 302 described later. The pickup lens array 29 divides the light beams emitted from the blue light source section 21 with the plurality of pickup lenses 291 into the same number of partial light beams as the number of pickup lenses 291. In the present embodiment, the pickup lens array 29 has the four pickup lenses 291, and divides the light beams emitted from the blue light source section 21 into the four partial light beams.

As shown in FIG. 5, the pickup lens array 29 is formed of a lens array having the plurality of pickup lenses 291 integrated with each other. The lens array of this kind can easily be manufactured using, for example, a press molding method. Further, as shown in FIG. 4, outer circumferences having an effective diameter of D1 of the four pickup lenses 291 are partially contiguous with each other. The effective diameter D1 of the pickup lenses 291 is no smaller than an effective diameter D2 (see FIG. 2) of the collimator lenses 221.

The pickup lenses 291 constituting the pickup lens array 29 are each formed of a plano-convex lens. The pickup lenses 291 make the respective partial light beams BL2 enter the diffusion element 30 in a converged state.

The diffusion element 30 has a substrate 301, and the plurality of diffusion areas 302 disposed in a first surface 301a of the substrate 301 so as to correspond to the plurality of partial light beams BL2 divided by the pickup lens array 29. The diffusion areas 302 are arranged in a 2×2 array along the Y-axis direction and the Z-axis direction, and are separated from each other. The pitch P1 between the diffusion areas 302 adjacent to each other coincides with the pitch P2 between the pickup lenses 291 adjacent to each other. It should be noted that it is also possible for the substrate 301 to be provided with a structure for promoting cooling such as a heatsink.

It should be noted that the pitch P1 between the diffusion areas 302 is a center-to-center distance between the diffusion areas 302 adjacent to each other. The pitch P2 between the pickup lenses 291 is a center-to-center distance between the pickup lenses 291 adjacent to each other.

In the diffusion element 30, the diffusion areas 302 each having convex structures, concave structures, or concavo-convex structures formed by providing processing such as texture processing or dimple processing are disposed on the first surface 301a of the substrate 301 at a plurality of places so as to be separated from each other. It is preferable for the convex structures, the concave structures, or the concavo-convex structures to perform the Lambertian reflection on the partial light beams, and at the same time, not to disturb the polarization state.

It should be noted that in the present specification, the "diffusion area" means an area of the diffusion element which the partial light beams enter, and in which the diffusion of the partial light beams actually occurs, but does not simply mean only the area where the convex structures, the concave structures, or the concavoconvex structures described above are formed. In other words, it is possible for the diffusion element to be provided with the convex structures, the concave structures, or the concavoconvex structures continuously formed on the entire surface of the substrate instead of the configuration having the plurality of areas where the convex structures, the concave structures, or the concavoconvex structures are formed so as to be separated from each other. Even in such a case, as long as there is provided a configuration in which the plurality of partial light beams enters the diffusion element at a plurality of places separated from each other, the diffusion element has the plurality of diffusion areas as a result.

In the case of the present embodiment, as shown in FIG. 3, the light beams BL emitted from the respective light emitting elements 211 pass through the pickup lens array 29 to thereby turn to the partial light beams BL2, and then enter the diffusion areas 302 corresponding respectively to the pickup lenses 291.

As shown in FIG. 2, the light diffusely reflected by the diffusion element 30 is hereinafter referred to as blue light beam BLc2. According to the present embodiment, by diffusely reflecting the blue light beam BLc1, it is possible to obtain the blue light beam BLc2 having a substantially homogenous illuminance distribution. For example, the blue light beam BLc1 as the clockwise circularly polarized light is diffusely reflected by the diffusion element 30 to thereby turn to the blue light beam BLc2 as the counterclockwise circularly polarized light. The blue light beam BLc2 is converted by the pickup lens array 29 into parallel light, and then enters the second wave plate 28b once again.

The blue light beam BLc2 as the counterclockwise circularly polarized light is transmitted through the second wave plate 28b to thereby be converted into the blue light beam BLs1 as the S-polarized light. The blue light beam BLs1 as the S-polarized light is reflected by the light splitting/combining element 25, and proceeds toward the lens integrator 31.

In such a manner as described above, the blue light beam BLs1 and the fluorescence YL are emitted from the light splitting/combining element 25 toward the same direction, namely the Y-axis direction. Therefore, the blue light beam BLs1 and the fluorescence YL as the yellow fluorescence are combined with each other by the light splitting/combining element 25 to turn to the composite light WL as white light.

The composite light WL is emitted toward the lens integrator 31. The lens integrator 31 has a first multi-lens 31a and a second multi-lens 31b. The first multi-lens 31a has a plurality of first small lenses 31am for dividing the composite light WL into a plurality of partial light beams.

A lens surface of the first multi-lens 31a, namely a surface of the first small lens 31am, and the image formation area of each of the light modulation devices 4R, 4G and 4B are conjugated with each other. Therefore, the shape of each of the first small lenses 31am is a rectangular shape as a substantially similar shape to the shape of each of the image formation areas of the light modulation devices 4R, 4G, and 4B. Thus, each of the partial light beams emitted from the first multi-lens 31a efficiently enters each of the image formation areas of the light modulation devices 4R, 4G, and 4B.

The second multi-lens 31b has a plurality of second small lenses 31bm corresponding respectively to the first small lenses 31am of the first multi-lens 31a. The second multi-lens 31b forms an image of each of the first small lenses 31am of the first multi-lens 31a in the vicinity of each of the image formation areas of the respective light modulation devices 4R, 4G, and 4B in cooperation with the superimposing lens 33.

The composite light WL having been transmitted through the lens integrator 31 enters the polarization conversion element 32. The polarization conversion element 32 is constituted by polarization split films and wave plates (both not shown) arranged in an array. The polarization conversion element 32 converts the composite light WL including the fluorescence YL as the non-polarized light into linearly polarized light, and then emits the linearly polarized light.

The polarization conversion element 32 converts the polarization direction of the composite light WL into a predetermined direction. More specifically, the polarization conversion element 32 makes the polarization direction of the composite light WL correspond to the direction of the transmission axis of a polarization plate disposed on the light incident side of each of the light modulation devices 4R, 4G, and 4B. Thus, the polarization direction of the red light LR, the green light LG, and the blue light LB obtained by separating the composite light WL as described above corresponds to the transmission axis direction of the incident side polarization plate of each of the light modulation devices 4R, 4G, and 4B. Therefore, the red light LR, the green light LG, and the blue light LB efficiently enter the image formation areas of the light modulation devices 4R, 4G, and 4B, respectively, without being blocked by the incident side polarization plates, respectively.

The composite light WL having been transmitted through the polarization conversion element 32 enters the superimposing lens 33. The superimposing lens 33 homogenizes the illuminance distribution of the composite light WL in the illumination target area in cooperation with the lens integrator 31.

In the light source device 2 according to the present embodiment, the light beams BL from the blue light source section 21 including the plurality of light emitting elements 211 is divided by the pickup lens array 29 into the plurality of partial light beams BL2, and then the partial light beams BL2 respectively enter the plurality of diffusion areas 302 on the diffusion element 30. According to this configuration, it is possible to decrease the density concentration of the light to the diffusion element 30, and thus, the load on the diffusion element 30 decreases. As a result, the possibility that the diffusion element 30 is damaged decreases, and it is possible to increase the reliability of the diffusion element 30.

Further, in the case of the present embodiment, since the outer circumference having the effective diameter D1 of the plurality of pickup lenses 291 are partially contiguous with each other, it is possible to make the partial light beams BL2 efficiently enter the plurality of small lenses 31am, 31bm of the lens integrator 31 in the posterior stage. Thus, it is possible to sufficiently exert the superimposing performance of the lens integrator 31.

Further, in the case of the present embodiment, since the pickup lens array 29 is constituted by the lens array having the plurality of pickup lenses 291 integrated with each other, it is possible to reduce the number of components of the pickup lens array 29, and at the same time, it is possible to enhance the productivity of the pickup lens array 29.

Further, in the case of the present embodiment, since the effective diameter D1 of the pickup lens 291 is no smaller than the effective diameter D2 of the collimator lens 221, it is possible to increase the incident angle of the light beams BL entering the diffusion element 30 from the pickup lens 291, and thus, it is possible to ensure the diffusion angle of the light in the diffusion element 30.

Further, in the case of the present embodiment, since the light source device 2 is provided with the light splitting/combining element 25 for performing the polarization split of the light beams BL from the blue light source 21, and the wavelength conversion element 27 for performing the wavelength conversion from the light beam BLs as one of the polarization components obtained by the light splitting/combining element 25 performing the polarization split into the fluorescence YE as the yellow fluorescence, it is possible to realize the light source device 2 for generating the illumination light WL as the white light.

Since the projector 1 according to the present embodiment is provided with the light source device 2 having the features described above, there can be obtained an image high in reliability, and small in luminance variation and color variation.

Second Embodiment

A second embodiment of the present disclosure will hereinafter be described using FIG. 6.

A projector and a light source device according to the second embodiment are substantially the same in configuration as those in the first embodiment, but are different in the configuration of the blue light source section from that of the first embodiment. Therefore, the description of the whole of the projector and the light source device will be omitted.

Figure 6:
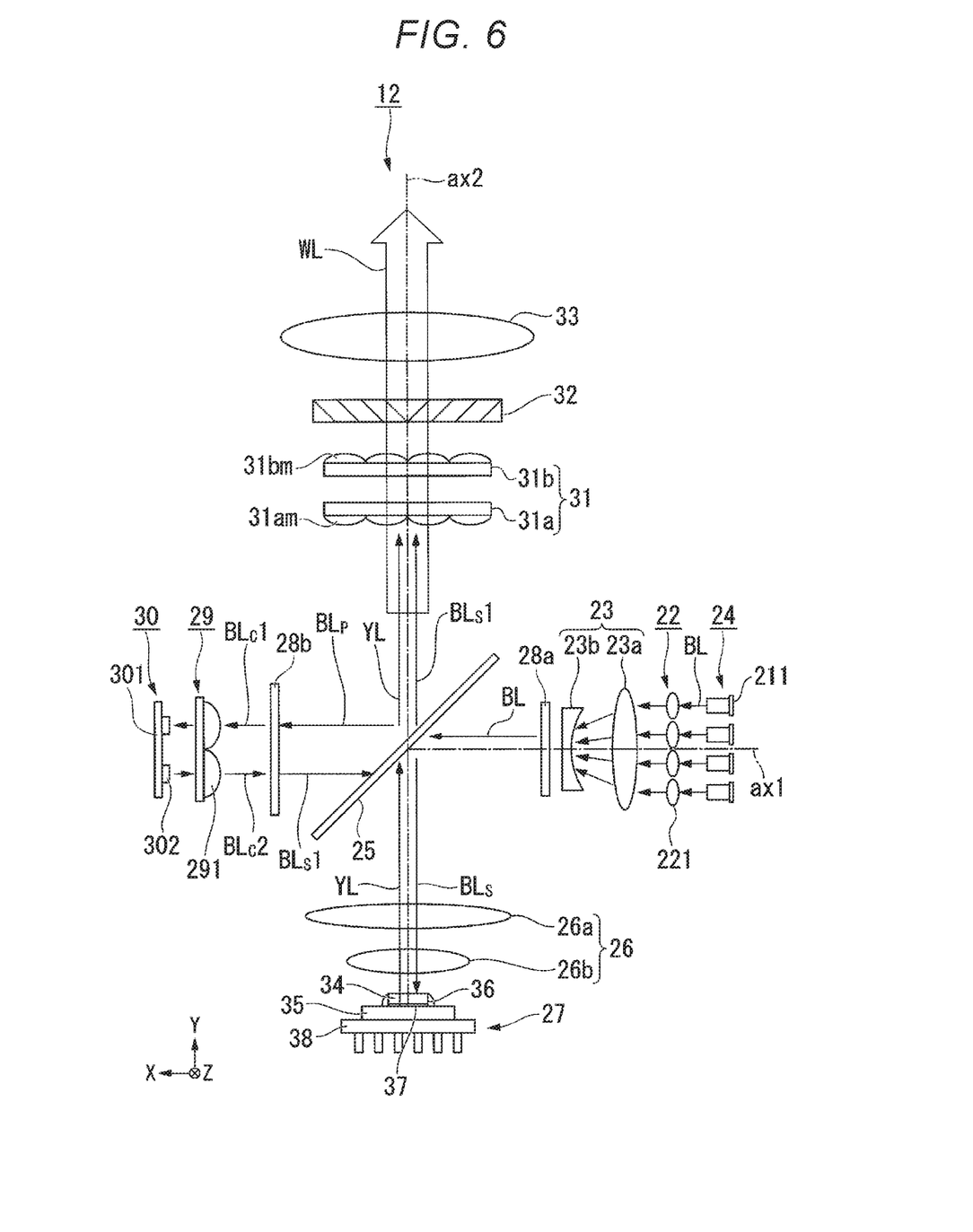
FIG. 6 is a schematic configuration diagram of an illumination device according to a second embodiment.

FIG. 6 is a schematic configuration diagram of the light source device according to the second embodiment.

In FIG. 6, the constituents common to FIG. 2 used in the first embodiment are denoted by the same reference symbols, and the description thereof will be omitted.

As shown in FIG. 6, in a light source device 12 according to the present embodiment, a blue light source section 24 has the plurality of light emitting elements 211 arranged in a 4×4 array along the Y-axis direction and the Z-axis direction in a plane perpendicular to the light axis ax1. Specifically, the blue light source section 24 in the present embodiment has the sixteen light emitting elements 211.

In contrast, the configurations of the pickup lens array 29 and the diffusion element 30 are substantially the same as those in the first embodiment. Specifically, the pickup lens array 29 has the plurality of pickup lenses 291 (the first lenses) arranged in a 2×2 array along the Y-axis direction and the Z-axis direction. Further, the diffusion element 30 has the plurality of diffusion areas 302 arranged in a 2×2 array along the Y-axis direction and the Z-axis direction. Therefore, in the case of the present embodiment, the number of the diffusion areas 302 is smaller than the number of the light emitting elements 211. As shown in the first embodiment and the second embodiment, it is desirable for the number of the diffusion areas 302 to be equal to or smaller than the number of the light emitting elements 211.

Therefore, in the case of the present embodiment, the light beams including the light beams BL emitted from the sixteen light emitting elements are divided by the pickup lens array 29 into four partial light beams BL2. Specifically, the light beams BL from the four light emitting elements 211 arranged in a 2×2 matrix enter one of the pickup lenses 291 to form one partial light beam BL2, and then enter one of the diffusion areas 302 of the diffusion element 30.

The rest of the configuration of the light source device 12 is substantially the same as in the first embodiment.

Also in the present embodiment, there can be obtained substantially the same advantages as those of the first embodiment such as the advantage that it is possible to realize the light source device 12 high in reliability of the diffusion element 30, and the advantage that it is possible to realize the projector 1 high in reliability of the light source device 12, and capable of obtaining an image small in luminance variation and color variation.

Further, in the case of the present embodiment, since the number of the light emitting elements 211 constituting the blue light source section 24 is larger than that in the first embodiment, it is possible to achieve the increase in luminance of the light source device 12. In particular, when realizing the light source device high in luminance, the configuration of the preset embodiment is effective.

MODIFIED EXAMPLE

It is possible for the light source device according to the present embodiment to have a configuration of the following modified example.

Figure 7:
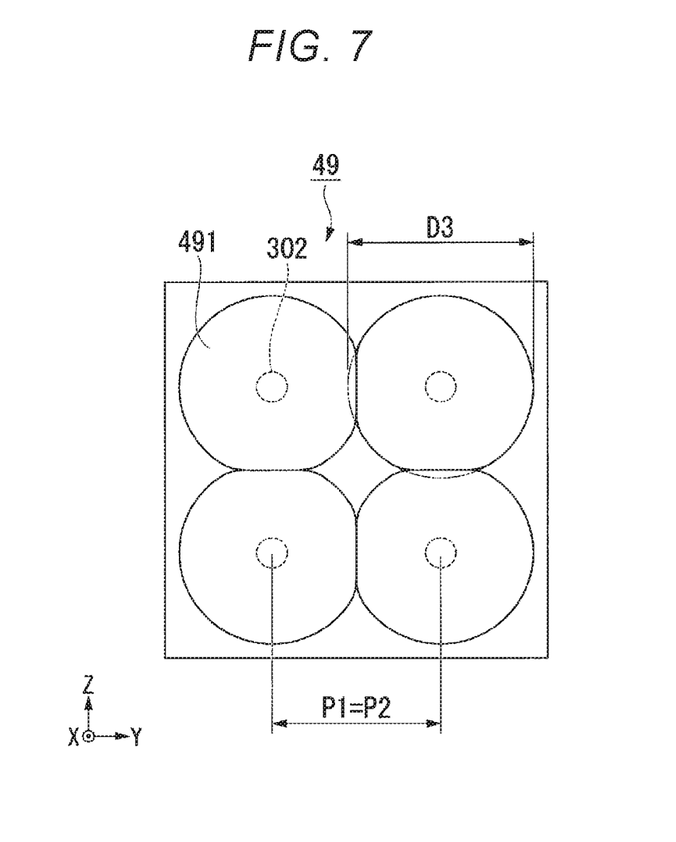
FIG. 7 is a front view of a pickup lens array in a modified example.

FIG. 7 is a front view of a pickup lens array 49 in the modified example.

As shown in FIG. 7, the pickup lens array 49 in the modified example has a plurality of pickup lenses 491 (the first lenses) arranged in a 2×2 array along the Y-axis direction and the Z-axis direction. Outer circumferences having the effective diameter D3 of the plurality of pickup lenses 491 are partially contiguous with each other.

In the case of the present modified example, unlike the embodiments described above, the effective diameter D3 of the pickup lenses 491 is larger than the pitch 92 between the pickup lenses 491 adjacent to each other. Therefore, when viewing the pickup lens array 49 from the light exit direction, the circles forming the external form having the effective diameter D3 of the pickup lenses 491 adjacent to each other partially overlap each other, and thus, the boundaries between the pickup lenses 491 adjacent to each other in the Y-axis direction and the Z-axis direction extend linearly.

In the case of the present modified example, since the effective diameter D3 of the pickup lenses 491 is larger than the effective diameter D1 of the pickup lenses 291, it is possible to further improve the overlapping performance of the lens integrator 31, and at the same time, it is possible to more sufficiently ensure the diffusion angle of the light beam.

It should be noted that the scope of the present disclosure is not limited to the embodiments described above, but a variety of modifications can be provided thereto within the scope or the spirit of the present disclosure.

For example, the light source sections each have a configuration in which the plurality of CAN package-type semiconductor layer elements each having one semiconductor laser chip housed in one package is arranged in the embodiments described above, but can have a multi-chip package type semiconductor laser element having a plurality of semiconductor laser chips housed in one package instead of the configuration described above.

Besides the above, the specific descriptions of the shape, the number, the arrangement, the material, and so on of the constituents of the light source device and the projector are not limited to those of the embodiments described above, but can arbitrarily be modified. Further, although in each of the embodiments described above, there is described the example of installing the light source device according to the present disclosure in the projector using the liquid crystal light valves, the example is not a limitation. The light source device according to the present disclosure can also be installed in the projector using digital micromirror devices as the light modulation devices.

Further, although in the embodiments described above, there is described the example of installing the light source device according to the present disclosure in the projector, the example is not a limitation. The light source device according to the present disclosure can also be applied to lighting equipment, a headlight of a vehicle, and so on.

What is claimed is:
1. A light source device comprising:
a plurality of light emitting elements;
a diffusion element which light beams including a plurality of beams emitted from the plurality of light emitting elements enter, and which diffuses the light beams; and
an optical element configured to divide the light beams emitted from the plurality of light emitting elements into a plurality of partial light beams;
a polarization split element disposed between the plurality of light emitting elements and the optical element; and
a wavelength conversion element configured to perform wavelength conversion of the beams emitted from the plurality of light emitting elements, wherein
the polarization split element splits the light beams emitted from the plurality of light emitting elements into a first polarization component and a second polarization component different from the first polarization component,
the first polarization component enters the diffusion element, and the second polarization component enters the wavelength conversion element, the diffusion element has a plurality of diffusion areas disposed so as to correspond to the plurality of partial light beams obtained by the optical element dividing the light beams emitted from the plurality of light emitting elements, the plurality of diffusion areas are separated from each other, and the optical element includes a plurality of first lenses disposed so as to correspond to the plurality of diffusion areas.

2. The light source device according to claim 1, wherein a number of the diffusion areas is no larger than a number of the light emitting elements.

3. The light source device according to claim 2, wherein the optical element includes a plurality of first lenses disposed so as to correspond to the plurality of diffusion areas.

4. The light source device according to claim 1, wherein outer circumferences having an effective diameter of the first lenses are partially contiguous with each other.

5. The light source device according to claim 3, wherein outer circumferences having an effective diameter of the first lenses are partially contiguous with each other.

6. The light source device according to claim 1, wherein the optical element is formed of a lens array having the plurality of first lenses integrated with each other.

7. The light source device according to claim 3, wherein the optical element is formed of a lens array having the plurality of first lenses integrated with each other.

8. The light source device according to claim 4, wherein the optical element is formed of a lens array having the plurality of first lenses integrated with each other.

9. The light source device according to claim 5, wherein the optical element is formed of a lens array having the plurality of first lenses integrated with each other.

10. The light source device according to claim 1, further comprising:

a second lens configured to collimate the beams emitted from the plurality of light emitting elements, wherein the effective diameter of the first lens is no smaller than an effective diameter of the second lens.

11. A projector comprising:

the light source device according to claim 1;

a light modulation device configured to modulate light from the light source device in accordance with image information; and a projection optical device configured to project the light modulated by the light modulation device.

12. The light source device according to claim 1, wherein the plurality of first lenses are arranged in a 2×2 array.

13. The light source device according to claim 1, wherein the plurality of diffusion areas are arranged in an array.

14. The light source device according to claim 13, wherein a pitch between the diffusion areas adjacent to each other coincides with a pitch between the first lenses adjacent to each other.

* * * * *